(12) United States Patent
Loh et al.

(10) Patent No.: US 10,888,792 B2
(45) Date of Patent: Jan. 12, 2021

(54) GAMING CONSOLE CHARGING STATION

(71) Applicant: Fosmon IP Holding Company, LLC, Woodbury, MN (US)

(72) Inventors: Shung Yat Loh, Woodbury, MN (US); Franco Marinari Acciani, Woodbury, MN (US)

( * ) Notice: Subject to any disclaimer, the term of this patent is extended or adjusted under 35 U.S.C. 154(b) by 0 days.

(21) Appl. No.: 16/434,557

(22) Filed: Jun. 7, 2019

(65) Prior Publication Data
US 2020/0384370 A1    Dec. 10, 2020

(51) Int. Cl.
*A63F 13/98*    (2014.01)
*A63F 13/24*    (2014.01)

(52) U.S. Cl.
CPC .............. *A63F 13/98* (2014.09); *A63F 13/24* (2014.09)

(58) Field of Classification Search
CPC .................................. A63F 13/98; A63F 13/24
USPC ................................................ 463/37, 38, 47
See application file for complete search history.

(56) References Cited

U.S. PATENT DOCUMENTS

| | | | |
|---|---|---|---|
| 6,329,786 B1 | 12/2001 | Ono | |
| D465,532 S | 11/2002 | Hussaini et al. | |
| 6,992,462 B1 | 1/2006 | Hussaini et al. | |
| D597,940 S * | 8/2009 | Navid | A47B 47/00 D13/108 |
| 8,020,711 B2 | 9/2011 | Sparling | |
| 8,143,848 B2 | 3/2012 | Navid | |
| 8,378,630 B2 | 2/2013 | Navid | |
| 8,591,333 B2 | 11/2013 | Ashida et al. | |
| 8,653,791 B2 | 2/2014 | Yoneyama et al. | |
| 9,174,121 B2 | 11/2015 | Navid | |
| 9,583,955 B2 * | 2/2017 | Navid | H02J 7/0044 |
| D781,784 S * | 3/2017 | Dingle | H02J 7/0045 D13/108 |
| 9,705,344 B2 | 7/2017 | David | |
| D833,389 S * | 11/2018 | Dunham | H02J 7/0044 D13/108 |
| D835,036 S * | 12/2018 | Dunham | H02J 7/025 D13/108 |
| 10,661,161 B2 * | 5/2020 | Bruckbock | H02J 7/0029 |
| 2008/0064500 A1 | 3/2008 | Satsukawa et al. | |
| 2008/0064504 A1 * | 3/2008 | Cole | A47B 47/00 463/47 |
| 2008/0150480 A1 * | 6/2008 | Navid | H01R 31/06 320/113 |
| 2010/0102777 A1 * | 4/2010 | Sa | H02J 7/0044 320/115 |
| 2011/0234154 A1 * | 9/2011 | Navid | H02J 7/0045 320/108 |
| 2011/0266231 A1 * | 11/2011 | Tsunezumi | A63F 13/23 211/26 |

(Continued)

FOREIGN PATENT DOCUMENTS

WO    WO-2012105098 A1 *    8/2012    ............ H02J 7/0044

*Primary Examiner* — Chase E Leichliter
(74) *Attorney, Agent, or Firm* — Haugen Law Firm PLLP

(57) ABSTRACT

A charging station for a simultaneous charging of multiple gaming controllers and multiple gaming controller supplement battery packs. The charging station supports and charges a game controller above the charging station while a supplement battery pack is simultaneously charged underneath the game controller. The charging station also includes electric current flow indicators associated with at least two gaming controllers and at least two supplement battery packs.

18 Claims, 10 Drawing Sheets

(56) References Cited

U.S. PATENT DOCUMENTS

| | | | |
|---|---|---|---|
| 2013/0221923 A1* | 8/2013 | Robertson | H01M 2/1022 320/112 |
| 2014/0235359 A1* | 8/2014 | Navid | A63F 13/02 463/47 |
| 2015/0190720 A1* | 7/2015 | Buller | A63F 13/98 463/47 |
| 2016/0141901 A1* | 5/2016 | Navid | H02J 7/025 320/108 |
| 2018/0076648 A1* | 3/2018 | Kumar | H02J 7/025 |
| 2019/0054372 A1* | 2/2019 | Morgan | H02J 7/1423 |

* cited by examiner

GAMING CONSOLE CHARGING STATION

CROSS-REFERENCE TO RELATED APPLICATIONS

Not Applicable

FEDERAL SPONSORSHIP

Not Applicable

JOINT RESEARCH AGREEMENT

Not Applicable

TECHNICAL FIELD

The present invention relates generally to a game controller charging station. More particularly, the present invention relates to a charging station having two support stations to charge two game controllers while simultaneously charging two supplement battery packs contained within two concealed compartments of the charging station.

BACKGROUND

Over the years the popularization of electronic gaming has influenced storage media and hardware products made available to electronic gaming consumers ("gamers"). The hardware products utilized by gamers have evolved over the years and electronic video games have further influenced improvements to various hardware components. By way of example, there have been many iterations and generations of consoles and gaming controllers created over the years for use with video games. The gaming consoles and controllers have evolved over the years, with many gaming controllers now being offered with a wireless connection to the console. The wireless gaming controller typically requires the use of batteries to provide power to the controller. The gamer may have an eco-friendly desire to recharge the batteries rather than replace and properly dispose of the depleted batteries.

The amount of continuous time gamers spend using the game controllers vary from minutes to many hours. Gamers using wireless battery powered game controllers typically do not want to delay game play while a controller is recharged. Further, some gamers may interchange game controller battery packs rather than charge a gaming console to thereby further avoid interruption in overall play of a game. Thus, there may be a desire to simultaneously recharge the battery pack within the controller along with recharging a supplemental battery pack. Additionally, many video games provide multi user modes which utilize multiple game controllers. Thus, there may be a further desire to simultaneously recharge multiple game controllers and multiple supplemental battery packs.

SUMMARY

Embodiments according to aspects of the present invention provide a compact recharging station that allows for the simultaneous recharging of multiple electronic video game controllers and supplement game controller battery packs. The charging station in accordance with aspects of the present invention includes a housing having first and second support stations formed in a top surface of the housing and first and second sockets extending into the housing. An electronic circuit is contained within the housing and electrically couples to a power supply, charging contacts of the first support station, charging contacts of the second support station, charging contacts of the first socket and charging contacts of the second station.

The first and second support stations have electrical charging contacts that are positioned adjacent the top surface of the housing, wherein the support stations have a structure that is suitable for receiving gaming controllers. Similarly, the first and second sockets have electrical charging contacts that are embedded in the housing within the sockets and positioned below a top surface of the housing. The sockets have a structure that is suitable for gaming controller supplement battery packs. The electronic circuit controls the distribution of electric current to the charging contacts of the first and second support stations and to the charging contacts of the first and second sockets.

In embodiments of the invention the electronic circuit of the charging station may include electric current detectors that are electrically coupled to the charging contacts of the first and second support stations and the charging contacts of the first and second sockets. The electronic circuit may further additionally or alternatively include light emitting diodes (LED) current flow indicators electrically coupled to the charging contacts of the first and second support stations and the first and second sockets. The electronic circuitry may further direct current simultaneously to the first and second gaming controllers and the first and second gaming controller supplement battery pack. When one or more gaming controllers or battery packs are not engaged to the charger, the electronic circuit disables current flow to the open charging contacts. The first and second gaming controller supplement battery packs may inserts into their respective first and second sockets sufficiently such that the gaming controller supplement battery pack charges while the corresponding gaming controller may be mounted over the battery pack and to the support station.

In use, a gamer may desire to recharge one or more supplemental battery pack and gaming controllers. The charging station in accordance with embodiments of the invention allows the user to charge one or two supplemental game controller battery packs while, when desired, simultaneously charging one or two game controllers. The electronic circuitry detects when one or more battery packs and one or more game controllers are electrically coupled to the charging station. When a circuit of a charging contact is closed the electronic circuitry will allow current to pass to the closed charging contact. When all four charging contacts are closed the electronic circuitry will allow simultaneous charging through all four charging contacts.

The accompanying drawings, which are incorporated in and constitute a portion of this specification, illustrate embodiments of the invention and, together with the detailed description, serve to further explain the invention. The embodiments illustrated herein are presently preferred; however, it should be understood, that the invention is not limited to the precise arrangements and instrumentalities shown. For a fuller understanding of the nature and advantages of the invention, reference should be made to the detailed description in conjunction with the accompanying drawings.

DESCRIPTION OF THE DRAWINGS

In the various figures, which are not necessarily drawn to scale, like numerals throughout the figures identify substantially similar components.

DETAILED DESCRIPTION

Figure 1:
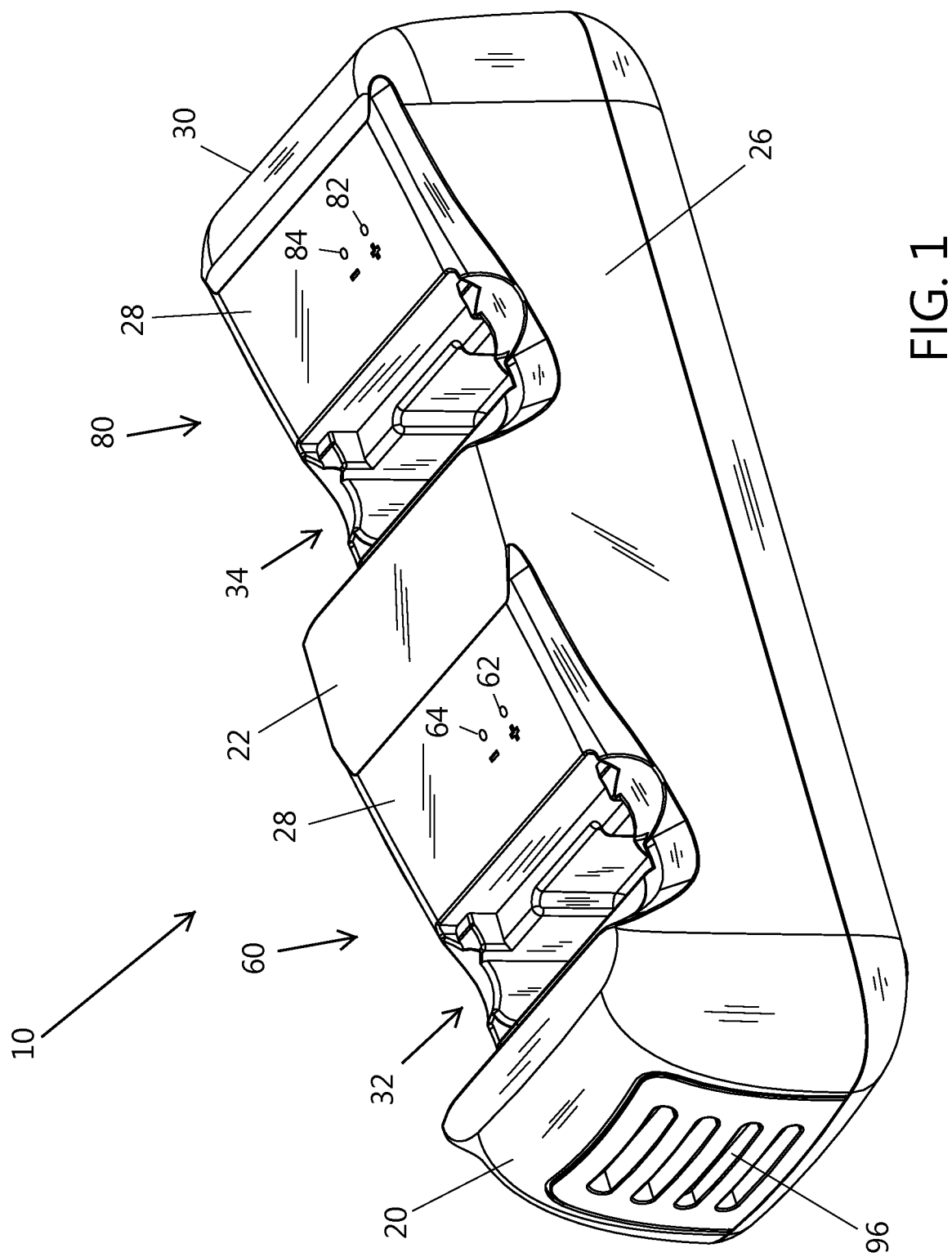
FIG. 1 is a front, right perspective view of a charging station in accordance with the present invention.
Figure 2:
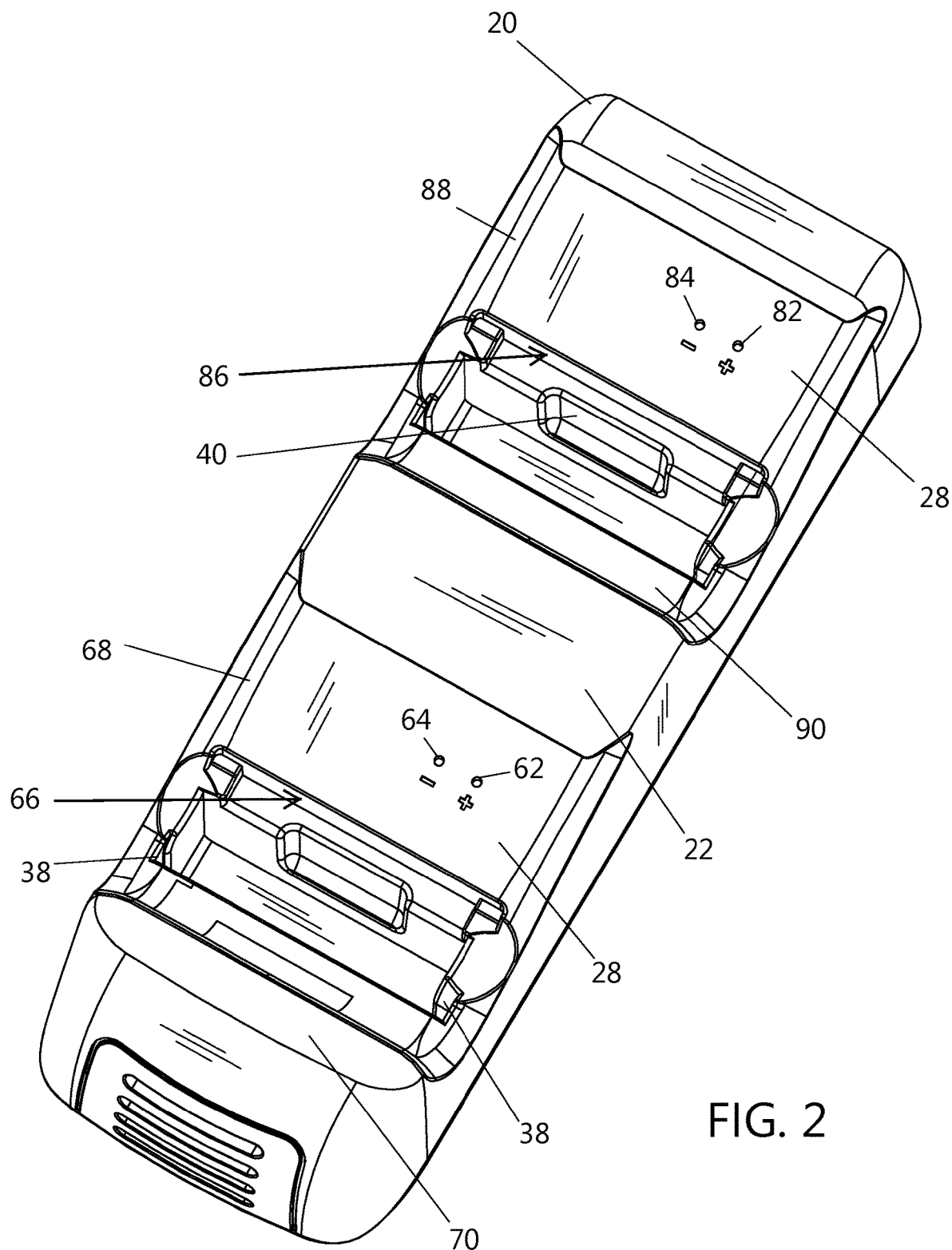
FIG. 2 is a top, front perspective view of a charging station in accordance with the present invention.
Figure 3:
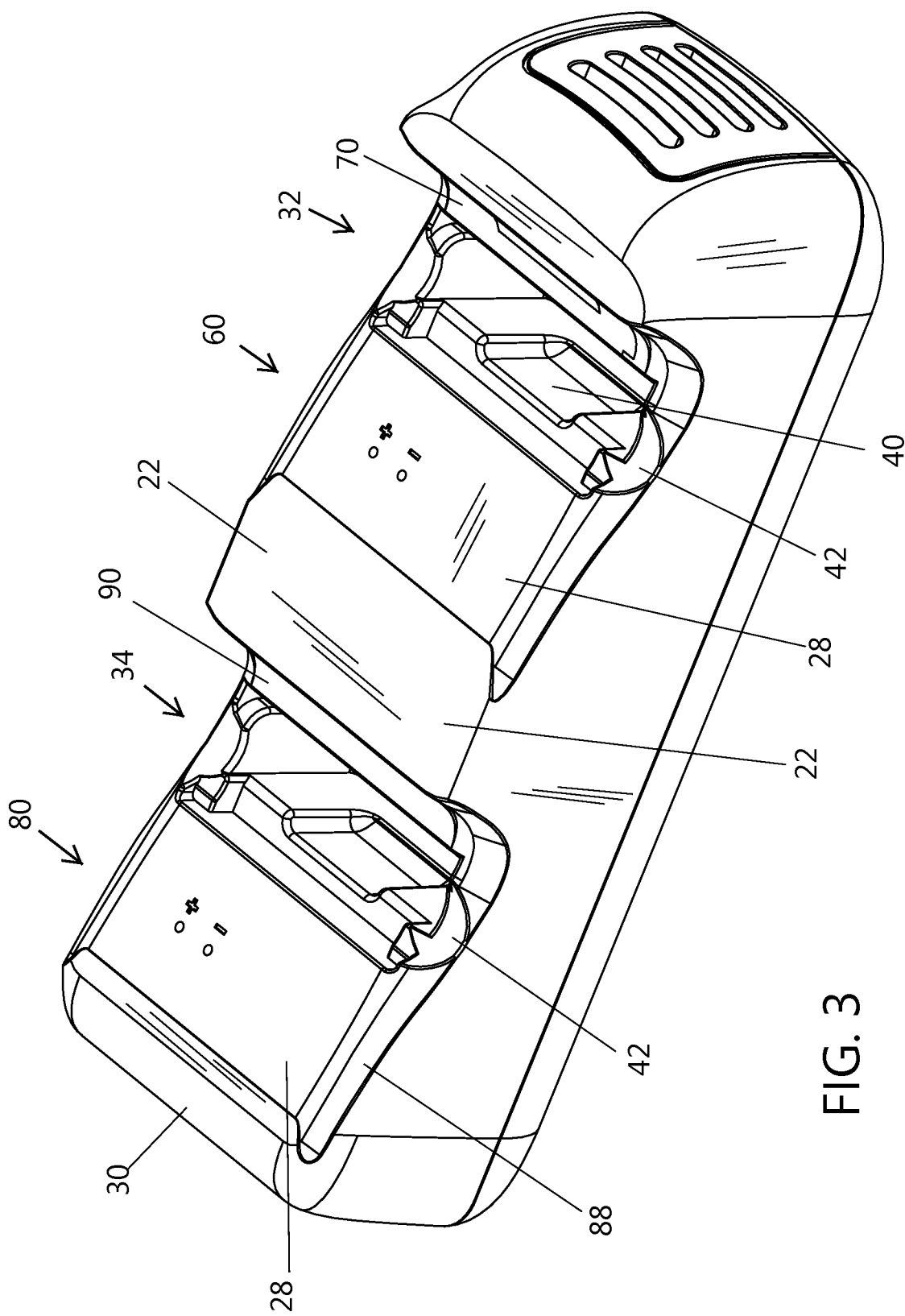
FIG. 3 is a front left perspective view of a charging station in accordance with the present invention.
Figure 4:
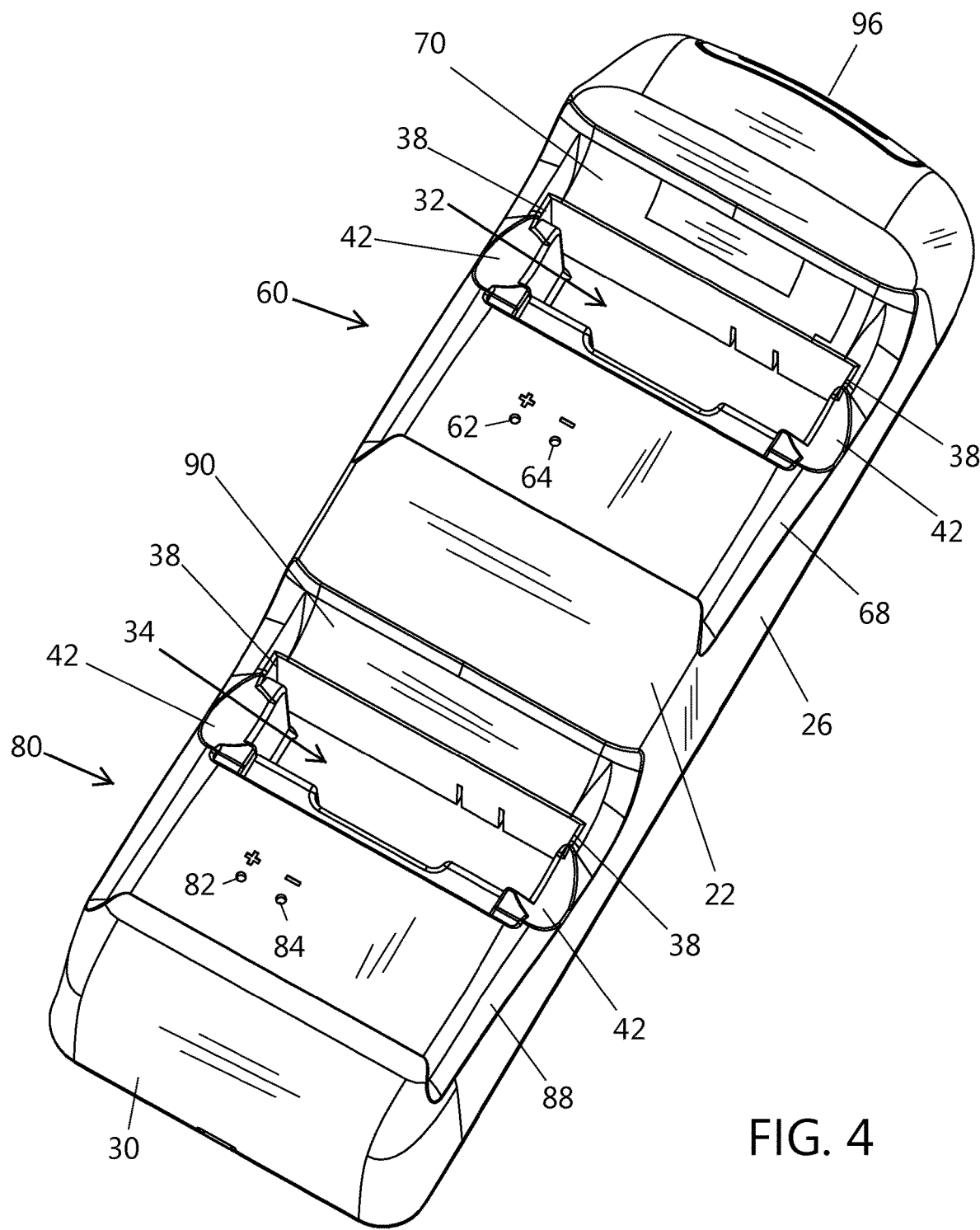
FIG. 4 is a top back perspective view of a charging station in accordance with the present invention.

The following description provides detail of various embodiments of the invention, one or more examples of which are set forth below. Each of these embodiments are provided by way of explanation of the invention, and not intended to be an undue limitation of the invention. Further, those skilled in the art will appreciate that various modifications and variations may be made in the present invention without departing from the scope or spirit of the invention. By way of example, those skilled in the art will recognize that features illustrated or described as part of one embodiment, may be used in another embodiment to yield a still further embodiment. Thus, it is intended that the present invention also cover such modifications and variations that come within the scope of the appended claims and their equivalents.

In an embodiment of the invention a compact game controller charging station 10 is provided that allows for simultaneous charging of the batteries of two handheld wireless game controllers and corresponding spare battery packs for each of the two game controllers. The game controller charging station 10 includes a housing 20 that is configured to receive and charge two game controllers engaged to the charging stations on a top surface of the housing, while supplemental battery packs for each controller are charged simultaneously underneath the corresponding controller. The front of the housing includes at least four LED's 96 such that at least one LED corresponds with each of a game controller or supplemental battery pack. When a controller or supplemental battery is present and engaged with the charging station the corresponding LED will illuminate. In this manner a user is able to confirm whether a charge is being applied to a corresponding controller or battery pack.

In accordance with aspects of the invention the charging station 10 includes a housing 20, a first support station 60, second support station 80, first charging socket 32, second charging socket 34 and a micro controller or electronic circuit 100. The first and second support stations 60 and 80 are formed in a top surface 22 of the housing 20. The first and second sockets 32 and 34 extend into housing 20 from the top 22 of the housing and each is aligned adjacent the corresponding first and second support stations 60 and 80. The support stations and sockets have electrical contacts that are positioned such that when a game controller or supplement battery pack is engaged thereto the electrical contacts align and contact the respective electrical contacts of the controller or supplemental battery pack. The electronic circuit includes printed circuit boards and circuitry to control the distribution of electrical charge from a power source 98. The circuitry includes current detectors and electrical couplings to LED's or current flow indicators to provide a charging indication to the user.

Figure 5:
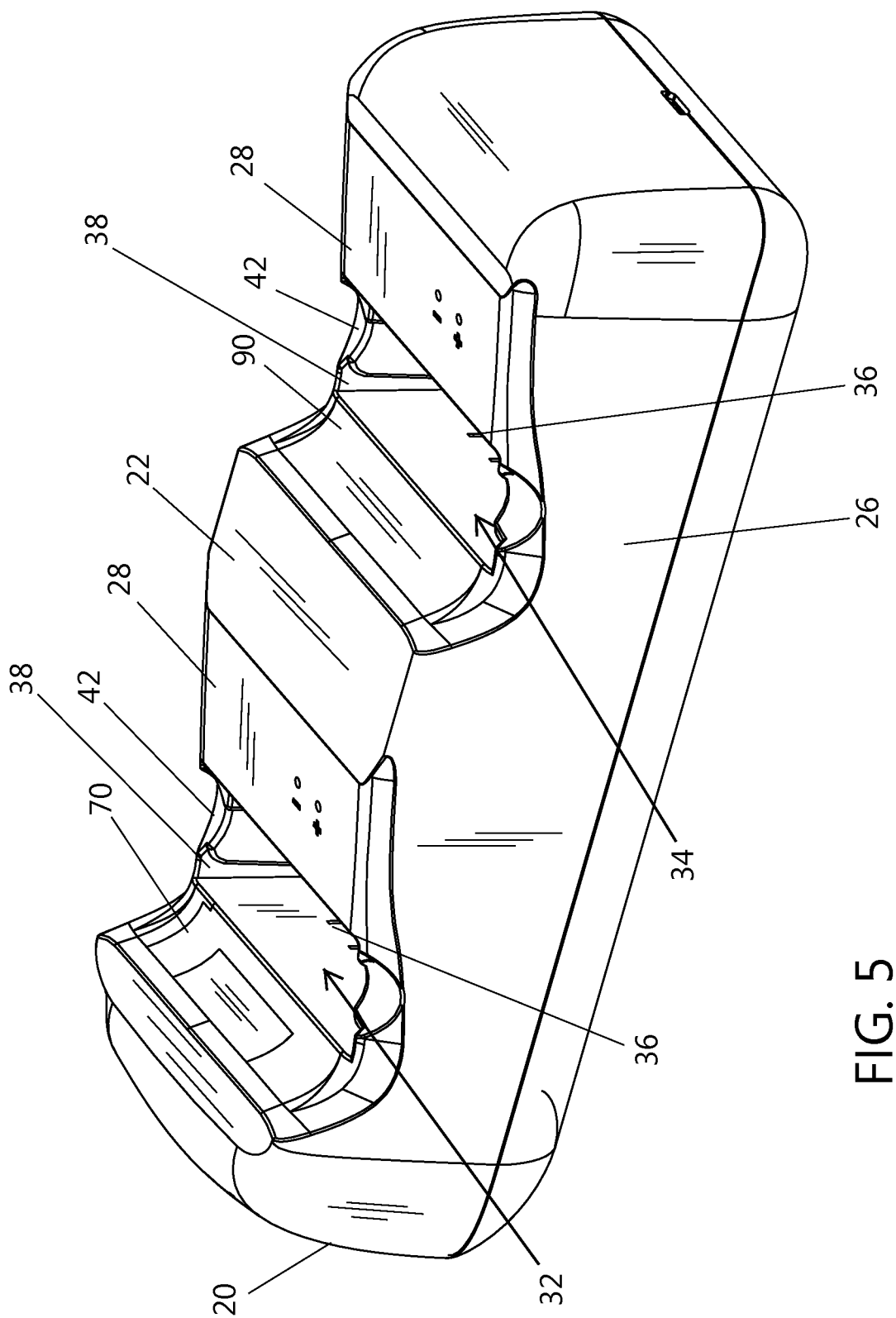
FIG. 5 is a right perspective view of a charging station in accordance with the present invention.
Figure 6:
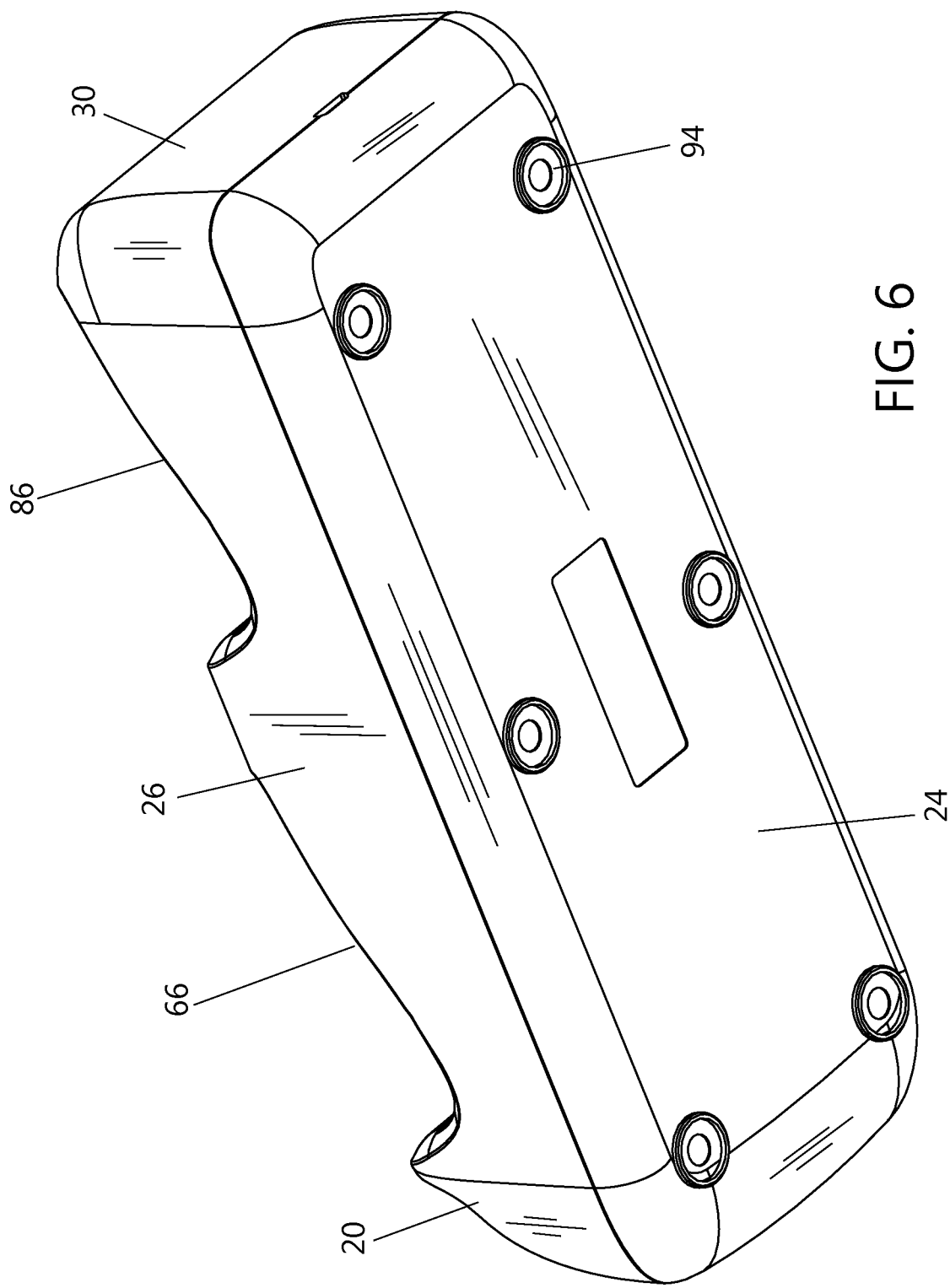
FIG. 6 is a bottom right perspective view of the charging station in accordance with the present invention.

With reference to the Figures various aspects of the invention will be further described. FIGS. 1-3 and 7 illustrates an exemplary charging station 10 having the first support station 60 and second support station 80 formed in a top 22 of the housing 20. The housing 20 includes top 22, bottom 24, sides 26 and ends 30. Top 22 includes two sloped top surfaces 28 which form a portion of the gaming controller receptacle 66 of the first support station 60 and a portion of the gaming controller receptacle 86 of second support station 80. With reference to first support station 60, the housing 20 further includes chamfered side top edges 68 and a sloping back 70 (see, also FIG. 5). The sloping back 70 provides a fixed stop as a game controller 14 slides down slope 28. The combination of the sloped top surface 28, chamfered side top edges 68 and sloped back 70 provide for at least a portion of the receptacle 66. Those skilled in the art will appreciate that the slope of the sloped top surface 26 and back 70 may be modified to accommodate various shapes of various game controllers. With reference to second support station 80, the housing 20 further includes chamfered side top edges 88 and a sloping back 90. The sloping back 90 provides a fixed stop as a game controller 16 slides down slope 28. The combination of the sloped top surface 28, chamfered side top edges 68 and sloped back 90 provide for at least a portion of the receptacle 86. Those skilled in the art will appreciate that the slope of the sloped top surface 26 and back 90 may be modified to accommodate various shapes of various game controllers.

The planar sloped top surface 28 associated with with the receptacle 66 of the support station 60 further includes positive electric contact 62 and negative electric contact 64 for electrically coupling to the first game controller 14. The planar sloped top surface 28 further includes positive electric contact 82 and negative electric contact 84 associated with the receptacle 86 of the second support station 80 for electrically coupling to the second game controller 16. As explained in further detail below, the game controller 14 includes a removable battery pack 50 on a bottom portion of the controller 14. When the controller 14 is resting on the top surface 22 of the first charging station 60 (engaged in the receptacle 66 for the gaming controller), the electrical contacts 62 and 64 are electrically coupled to exposed contacts of the battery pack 50. Also, the game controller 16 includes a removable battery pack 54 on a bottom portion of the controller 16. When the controller 16 is resting on the top surface 22 of the second charging support station 80 (engaged in the receptacle 86 for the gaming controller), the electrical contacts 82 and 84 are electrically coupled to exposed contacts of the battery pack 54.

With reference in particular to FIGS. 3-6 and 7 the housing 20 further includes first and second sockets 32 and 34 formed and extending into the housing 20. The first socket 32 extends into the housing 20 adjacent the first support station 60 and is positioned below the top 22 of the housing 20. The second socket 34 extends into the housing 20 adjacent the second support station 80 and is positioned below the top 22 of the housing 20. Both Sockets 32 and 34 include electric charging contacts (positioned within slots 36 for the contacts) that align and engage with contacts exposed on the supplemental battery packs 52 and 56. Slots 38 are sized to receive a flange 58 extending from the sides of the batter packs 52 and 56 (see FIG. 7) and guide channels 40 are formed into the sockets 32 and 34 to facilitate alignment of the battery packs 52 and 56 within the sockets 32 and 34. Further, recesses 42 extend into top rim 44. The recesses allow for a user to more easily position a finger thumb under the battery pack or the game control to remove the batter pack or controller from the charging station 10.

Figure 7:
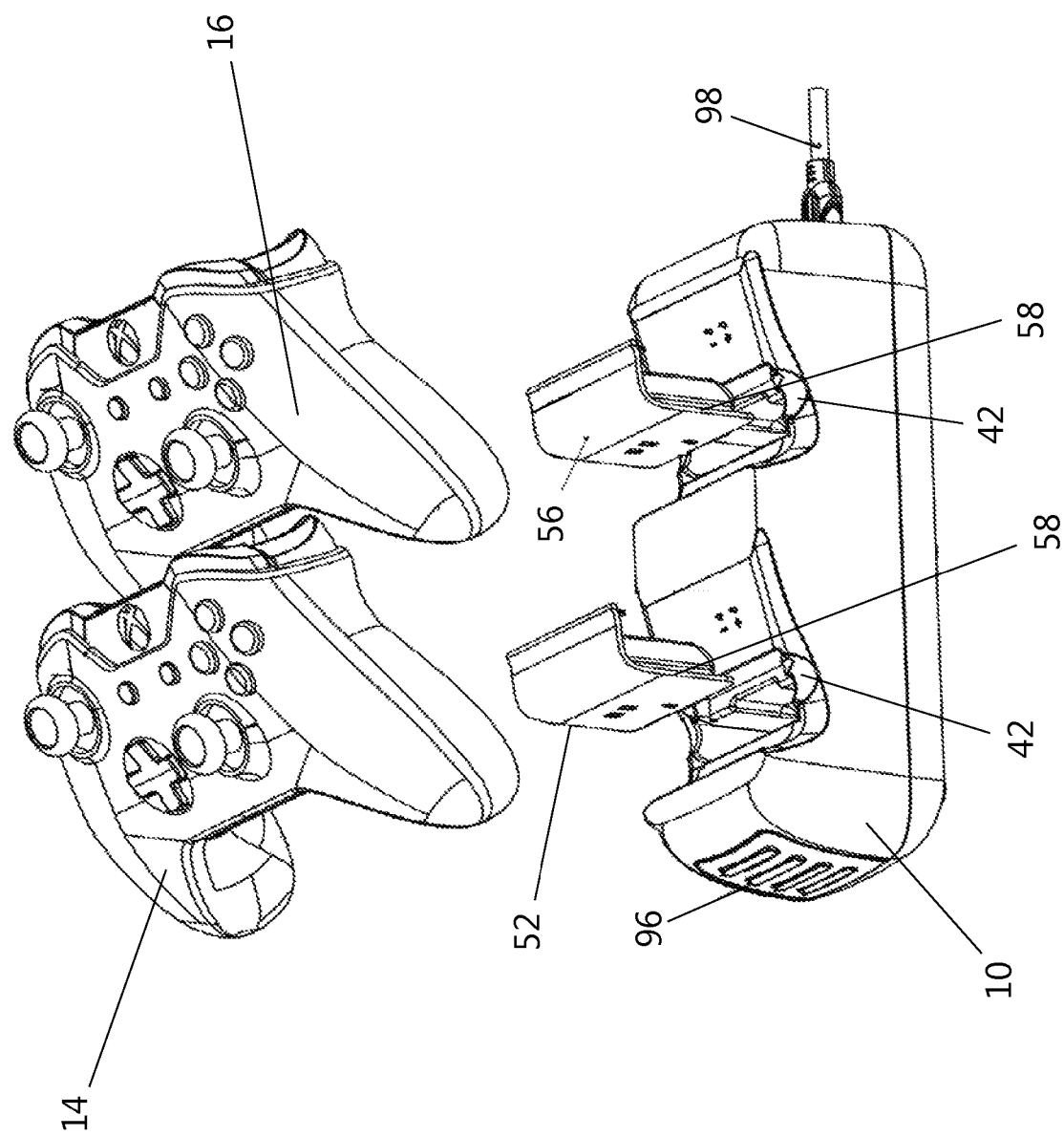
FIG. 7 is a right side perspective view of a charging station in accordance with the present invention illustrating multiple gaming controllers and gaming controller supplemental battery packs elevated above the charging stations.

With reference to FIG. 7, a user may insert one or both of the gaming controller supplement battery packs 52 and 56 into the corresponding first and second sockets 32 and 34 of the housing 20 of the charging station 10. Flanges 58 on the sides of the battery packs align in the slots 38 of the first and second sockets 32 and 34 to thereby align the contacts 35 in the sockets with contacts on the battery packs 52 and 56. Thumb indents 42 make it easier for a user to remove the battery packs from the sockets. Game controllers 14 and 16 may be engaged in respective receptacles 66 and 86 to thereby charge the controller's battery. The electronic circuit 100 within the charging station 10 enables a user to charge a single battery pack or single controller or, alternatively, a user may choose to simultaneously charge both battery packs 52 and 56 along with the batteries in both controllers 14 and 16.

Figure 8:
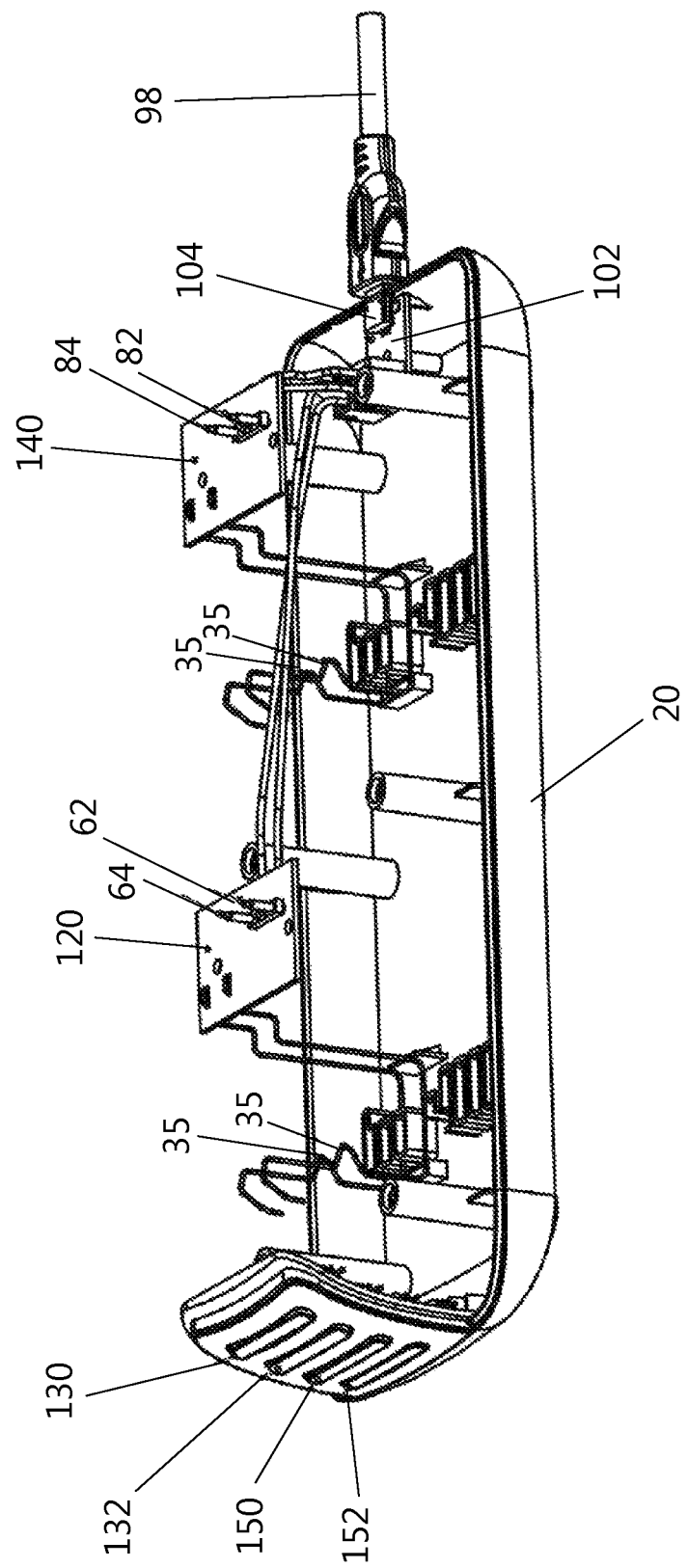
FIG. 8 is a right side perspective view of a charging station in accordance with the present invention illustrating a top cover of the charging station housing removed.
Figure 9:
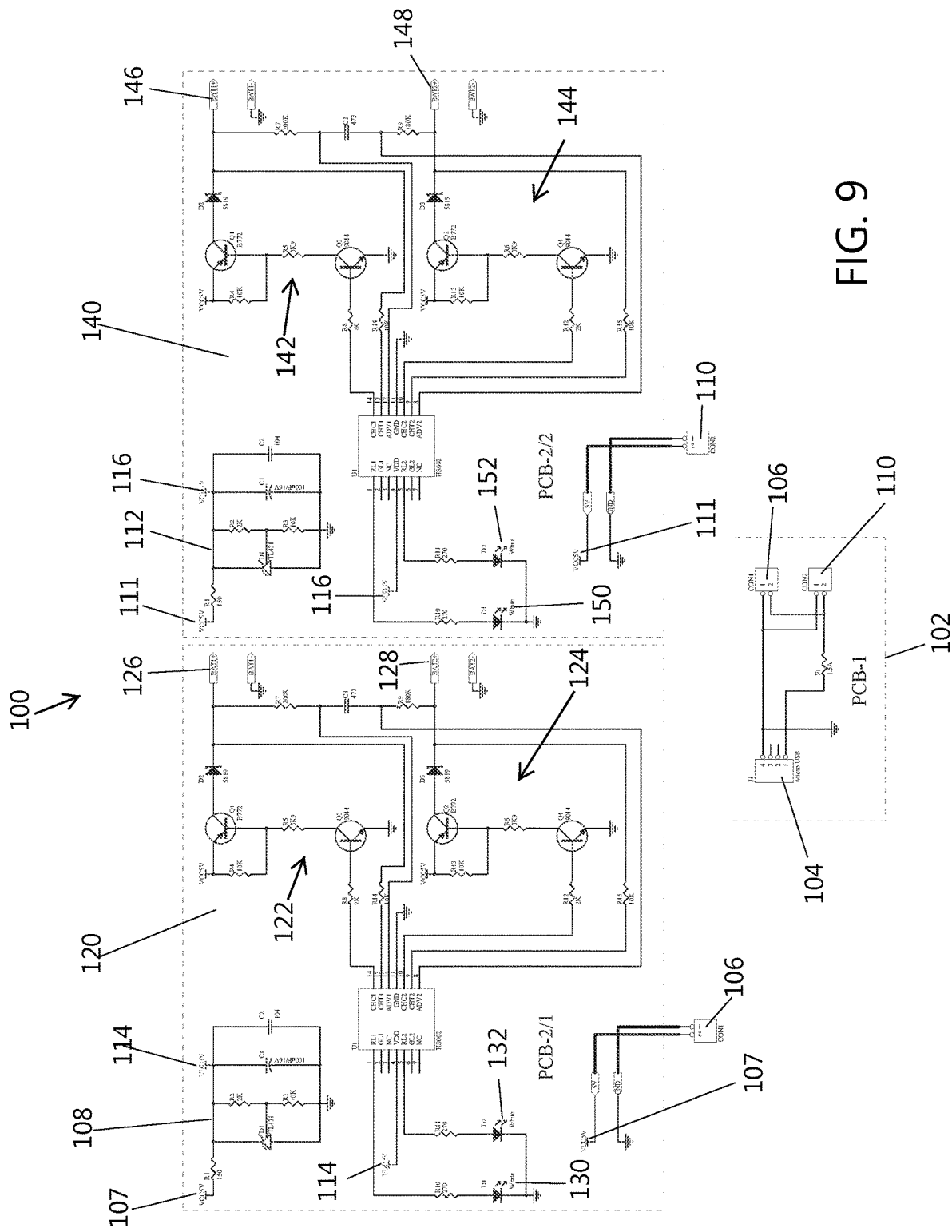
FIG. 9 is an electronic circuit diagram illustrating the electrical interconnections of the charging station in accordance with the present invention.
Figure 10:
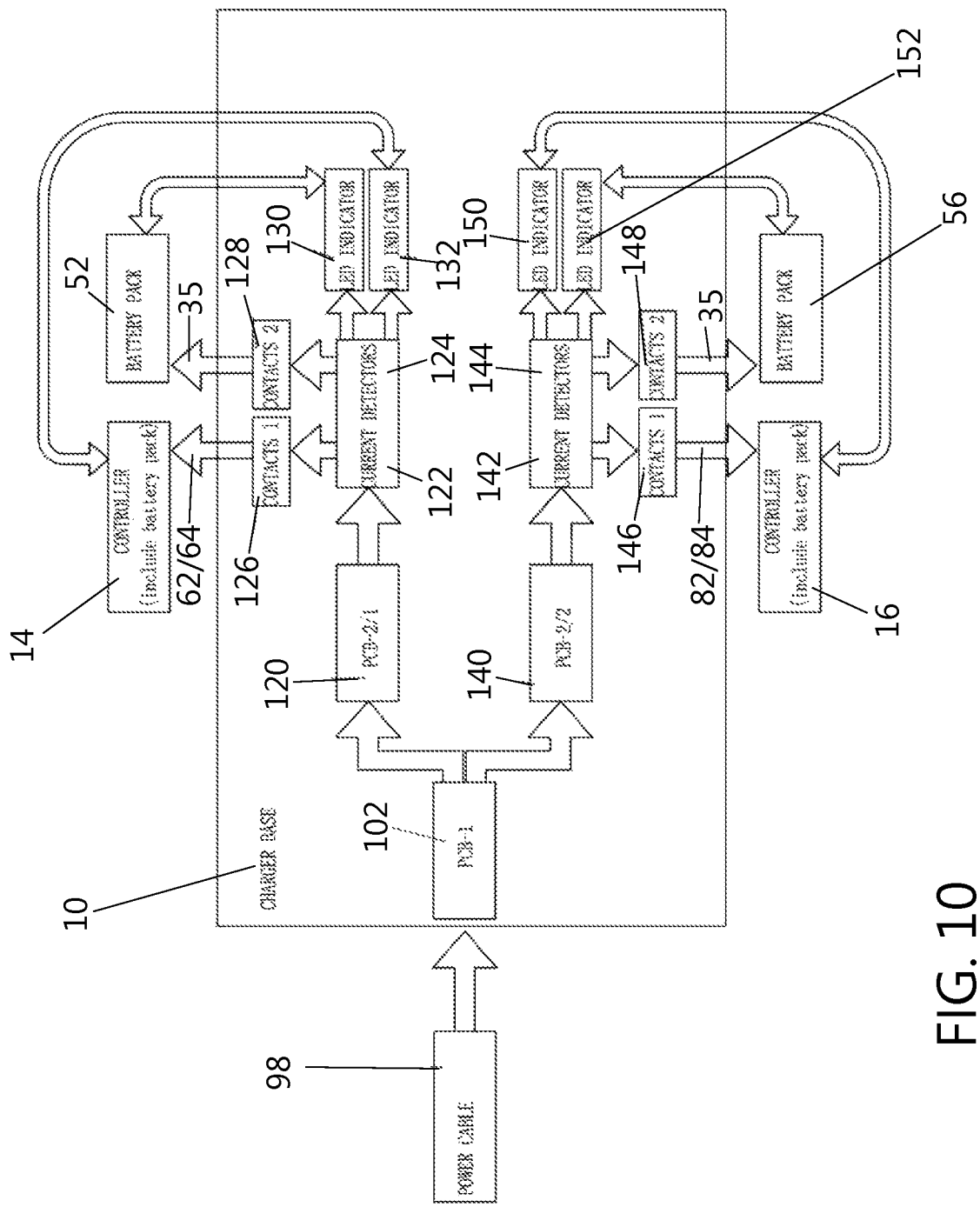
FIG. 10 is a block diagram illustrating various components of the charging station in accordance with the present invention.

FIGS. 8-10 further illustrates the electronic circuit and electrical controls of the charging station of the present invention. Within the housing 20 the electronic circuit 100 includes printed circuits 102, 120 and 140. The printed circuit 102 couples and routes the current from the power supply 98 to the circuits 120 and 140. The power supply 98 may couple to the printed circuit 102 via a micro USB 104 connection point. Connectors 106 and 110 further link the respective circuits 120 and 140 and convert the source voltage with transformers 108 and 112. Connectors 106 and 110 are electrically linked to transformers 108 and 112 via electrical connections 107 and 111. The electrical out from respective transformer 108 and 112 is identified at 114 and 116. Printed circuit 120 receives current from electrical out 114 and current flows through current detectors 122 and 124. The current detectors 122 and 124 are coupled to the contacts 62/64 and 35 corresponding to the first station 60 and socket 32. When a controller or battery are present, a current flows to the battery and to corresponding LED's 130 and 132. Printed circuit 140 receives current from electrical out 116 and current flows through current detectors 142 and 144. The current detectors 142 and 144 are coupled to the contacts 82/84 and 35 corresponding to the second station 80 and socket 34. When a controller or battery are present, a current flows to the battery and to corresponding LED's 150 and 152.

The electronic circuit 100 includes LED's 130, 132, 150 and 152 that indicate current flow by interconnecting the LED's to the charging contacts of the first support station 62 and 64, the charging contacts of the second support station 82 and 84, the charging contacts of the first socket 35, and the charging contacts of the second socket 35. The first gaming controller 14, second gaming controller 16, first gaming controller supplement battery pack 52, and second gaming controller supplement battery pack 56 may all charge simultaneously or individually. As noted above, the first gaming controller supplement battery pack 52 inserts into the first socket 32 sufficiently such that the first gaming controller supplement battery pack 52 charges while the first gaming controller 14 may be mounted to the first support station 60 in the receptacle 66. Similarly, the second gaming controller supplement battery pack 56 inserts into the second socket 34 sufficiently such that the second gaming controller supplement battery pack 56 charges while the second gaming controller 16 may be mounted to the second support station 80 in the receptacle 86.

The various embodiments described herein are illustrative of the present invention and not limiting as to the scope and spirit of the present invention. These and various other aspects and features of the invention are described with the intent to be illustrative, and not restrictive. This invention has been described herein with detail in order to comply with the patent statutes and to provide those skilled in the art with information needed to apply the novel principles and to construct and use such specialized components as are required. It is to be understood, however, that the invention can be carried out by specifically different constructions, and that various modifications, both as to the construction and operating procedures, can be accomplished without departing from the scope of the invention. Further, in the appended claims, the transitional terms comprising and including are used in the open ended sense in that elements in addition to those enumerated may also be present. Other examples will be apparent to those of skill in the art upon reviewing this document.

What is claimed is:

1. A charging station for gaming controllers, the charging station comprising:
    a housing;
    a first support station formed from a top surface of the housing and having electrical charging contacts extending outward and adjacent from the top surface of the housing, the first support station adapted for receiving a first gaming controller;
    a second support station formed from the top surface of the housing and having electrical charging contacts extending outward and adjacent from the top surface of the housing, the second support station adapted for receiving a second gaming controller;
    a first socket extending into the housing adjacent the first support station and having electrical charging contacts embedded within the first socket and positioned below the top surface of the housing, the first socket adapted for receiving a first gaming controller supplement battery pack;
    a second socket extending into the housing adjacent the second support station and having electrical charging contacts embedded within the second socket and positioned below the top surface of the housing, the second socket adapted for receiving a second gaming controller supplement battery pack;
    an electronic circuit interconnected to: a power supply, the charging contacts of the first support station, the charging contacts of the second support station, the charging contacts of the first socket and the charging contacts of the second socket; and
    wherein the electronic circuit controls the distribution of electric current to the charging contacts of the first support station, to the charging contacts of the second support station, to the charging contacts of the first socket, and to the charging contacts of the second socket.

2. The charging station as recited in claim 1, wherein the electronic circuit includes current detectors electrically interconnected to: the charging contacts of the first support station, the charging contacts of the second support station, the charging contacts of the first socket, and the charging contacts of the second socket.

3. The charging station as recited in claim 1, wherein the electronic circuit includes LED current flow indicators electrically interconnected to: the charging contacts of the first support station, the charging contacts of the second support station, the charging contacts of the first socket, and the charging contacts of the second socket.

4. The charging station as recited in claim 1, wherein the first gaming controller, second gaming controller, first gaming controller supplement battery pack, and second gaming controller supplement battery pack all charge simultaneously.

5. The charging station as recited in claim 1, wherein the first gaming controller rests on top of the top surface of the first support station and the electrical contacts of the first support station while charging.

6. The charging station as recited in claim 1, wherein the second gaming controller rests on top of the top surface of the second support station and the electrical contacts of the second support station while charging.

7. The charging stations as recited in claim 1, wherein the first gaming controller supplement battery pack inserts into the first socket sufficiently such that the first gaming controller supplement battery pack charges while the first gaming controller may be mounted to the first support station.

8. The charging stations as recited in claim 1, wherein the second gaming controller supplement battery pack inserts into the second socket sufficiently such that the second gaming controller supplement battery pack charges while the second gaming controller may be mounted to the second support station.

9. A charging station for a-gaming controllers, the charging station comprising:
   a housing;
   a first support station formed in a top surface of the housing and having electrical charging contacts adjacent the top surface of the housing, the first top surface having a slope that is not parallel to a bottom surface of the housing and the first support station further having a sloping back stop wherein the first support station is adapted for receiving a first gaming controller and the sloping back stop of the first support station provides a fixed stop for the first gaming controller;
   a second support station formed in the top surface of the housing and having electrical charging contacts adjacent the top surface of the housing, the second top surface having a slope that is not parallel to a bottom surface of the housing and the second support station having a sloping back stop wherein the second support station is adapted for receiving a second gaming controller and the sloping back stop of the second support station provides a fixed stop for the second gaming controller;
   a first socket extending into the housing adjacent the first support station and having electrical charging contacts embedded within the first socket and positioned below the top surface of the housing, the first socket adapted for receiving a first gaming controller supplement battery pack;
   a second socket extending into the housing adjacent the second support station and having electrical charging contacts embedded within the second socket and positioned below the top surface of the housing, the second socket adapted for receiving a second gaming controller supplement battery pack;
   an electronic circuit electrically interconnected with a power supply, the charging contacts of the first support station, the charging contacts of the second support station, the charging contacts of the first socket and the charging contacts of the second socket; and
   wherein the electronic circuit controls the distribution of electric current to the charging contacts of the first support station, to the charging contacts of the second support station, to the charging contacts of the first socket, and to the charging contacts of the second socket; and
   wherein the first gaming controller rests on top of the first support station while charging; and
   wherein the first gaming controller supplement battery pack inserts into the first socket sufficiently such that the first gaming controller supplement battery pack charges while the first gaming controller is mounted to the first support station.

10. The charging station as recited in claim 9, wherein the electronic circuit includes current detectors electrically interconnected to: the first support station, second support station, first socket, and second socket.

11. The charging station as recited in claim 10, wherein the electronic circuit includes LED current flow indicators electrically interconnected to: the first support station, second support station, first socket, and second socket.

12. The charging station as recited in claim 9, wherein the first gaming controller, second gaming controller, first gaming controller supplement battery pack, and second gaming controller supplement battery pack all charge simultaneously.

13. The charging station as recited in claim 12, wherein the second gaming controller rests on top of the second support station while charging.

14. The charging stations as recited in claim 12, wherein the second gaming controller supplement battery pack inserts into the second socket sufficiently such that the second gaming controller supplement battery pack charges while the second gaming controller is mounted to the second support station.

15. A charging station for gaming controllers, the charging station comprising:
   a housing;
   a first support station formed in a first sloping top surface of the housing and having electrical charging contacts extending from the first sloping top surface of the housing, the first support station adapted for receiving a first gaming controller;
   a second support station formed in a second sloping top surface of the housing and having electrical charging contacts extending from the second sloping top surface of the housing, the second support station adapted for receiving a second gaming controller;
   a first socket extending into the housing adjacent the first support station and having electrical charging contacts embedded within the first socket and positioned below the first sloping top surface of the housing, the first socket adapted for receiving a first gaming controller supplement battery pack;
   a second socket extending into the housing adjacent the second support station and having electrical charging contacts embedded within the second socket and positioned below the second sloping top surface of the housing, the second socket adapted for receiving a second gaming controller supplement battery pack;

an electronic circuit electrically coupled to: a power supply, the charging contacts of the first support station, the charging contacts of the second support station, the charging contacts of the first socket and the charging contacts of the second socket, wherein the electronic circuit controls the distribution of electric current to the charging contacts of the first support station, to the charging contacts of the second support station, to the charging contacts of the first socket, and to the charging contacts of the second socket;

wherein the first gaming controller rests on top of the first support station while charging; and wherein the first gaming controller supplement battery pack inserts into the first socket sufficiently such that the first gaming controller supplement battery pack charges while the first gaming controller is mounted to the first support station; and wherein the second gaming controller rests on top of the second support station while charging; and wherein the second gaming controller supplement battery pack inserts into the second socket sufficiently such that the second gaming controller supplement battery pack charges while the second gaming controller is mounted to the second support station.

16. The charging station as recited in claim 15, wherein the electronic circuit includes current detectors electrically interconnected to: the first support station, second support station, first socket, and second socket.

17. The charging station as recited in claim 16, wherein the electronic circuit includes LED current flow indicators electrically interconnected to: the first support station, second support station, first socket, and second socket.

18. The charging station as recited in claim 17, wherein the first gaming controller, second gaming controller, first gaming controller supplement battery pack, and second gaming controller supplement battery pack all charge simultaneously.

* * * * *